United States Patent [19]

Cooper

[11] 3,970,295
[45] July 20, 1976

[54] PIPE FITTING LOCATOR APPARATUS
[75] Inventor: Cleveland N. Cooper, Kirkwood, Mo.
[73] Assignee: The Pandjiris Weldment Co., St. Louis, Mo.
[22] Filed: Feb. 3, 1975
[21] Appl. No.: 546,206

[52] U.S. Cl. .................................. 269/17; 269/71
[51] Int. Cl.² .......................................... B23Q 3/00
[58] Field of Search ................... 269/17, 71, 58, 60; 228/44; 254/98

[56] References Cited
UNITED STATES PATENTS

| | | | |
|---|---|---|---|
| 2,391,510 | 12/1945 | Pioch et al. | 269/17 |
| 2,409,468 | 10/1946 | Bock | 269/17 |
| 3,027,158 | 3/1962 | Barbee | 269/71 |
| 3,066,930 | 12/1962 | Chinnich | 269/71 |
| 3,463,137 | 8/1969 | Hare | 269/60 |
| 3,595,527 | 7/1971 | Douglass | 254/98 |

Primary Examiner—Al Lawrence Smith
Assistant Examiner—Robert C. Watson
Attorney, Agent, or Firm—Cohn, Powell & Hind

[57] ABSTRACT

A locator apparatus for supporting a branch pipe fitting adjacent a main pipe for accurately positioning the fitting incident to the welding of the fitting to the pipe. The apparatus includes a track-mounted base located under the pipe, the base being provided with a pivotally mounted horizontal radial arm having a saddle mounted for horizontal movement along the arm. The saddle carries a post having a collar assembly mounted for vertical and rotational movement relative to the post, and the collar assembly provides a support plate to which the branch pipe fitting is mounted. The locator thereby provides the fitting with longitudinal, lateral and vertical linear movement relative to the axis of the main pipe and two different angular movements, about the axis of the post and the axis of the base respectively.

5 Claims, 7 Drawing Figures

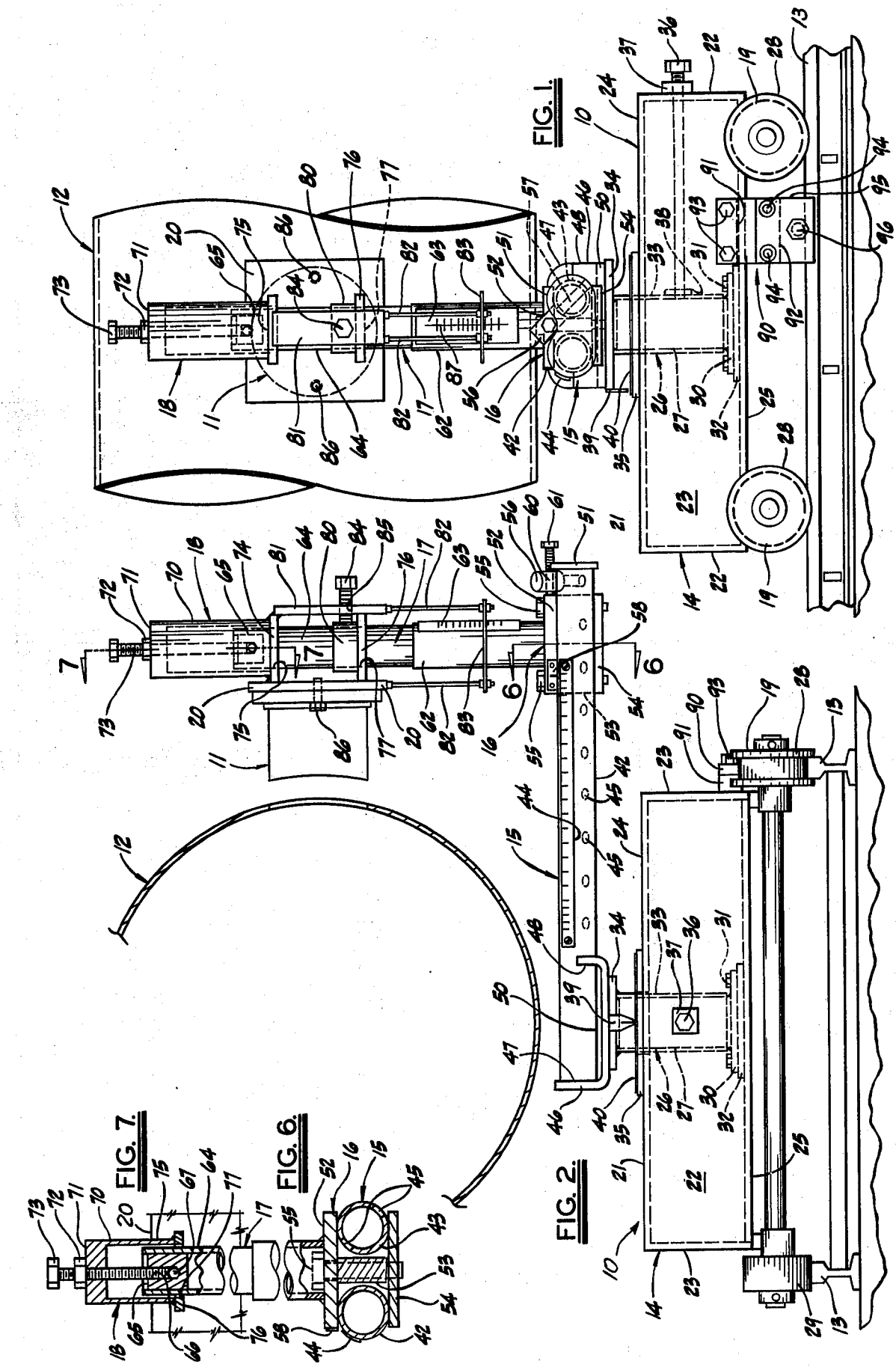

PIPE FITTING LOCATOR APPARATUS

BACKGROUND OF THE INVENTION

This invention relates generally to an apparatus for positioning branch pipe fittings incident to welding such fittings to a main pipe.

The welding of pipe fittings to main pipes presents problems of considerable magnitude insofar as the supporting of the fittings during the welding process is concerned. It is most important that the fitting be accurately located and held at an exact position lengthwise of the main pipe and at the correct elevation, as well as being offset the correct distance adjacent the main pipe. In addition, in many instances, the fitting is to be attached to the main pipe at an angle of inclination other than perpendicular to the longitudinal axis of the main pipe. It is important that the means by which the fitting is located does not restrict accessibility unduly and that, once positioned, the fitting is securely held in place during the welding process.

The apparatus described herein provides a means of accurately positioning and supporting branch pipe fittings in a manner which is not only more accurate than can be achieved by conventional jigs, but is also considerably less time consuming in use.

SUMMARY OF THE INVENTION

It is an important object of this invention to provide a pipe fitting locator apparatus having a base disposed below a main pipe for longitudinal movement relative thereto, and a pipe fitting support mounted to the base for lateral and vertical movement relative to the longitudinal axis of the main pipe, horizontal swinging movement relative to the base, and rotational movement about its own pivot axis.

It is an object to provide mounting means for the pipe fitting support which includes a horizontal radial arm swingingly mounted to the base, and a carriage in the form of a movable saddle mounted to the arm, said saddle carrying the support at a selected radius from the pivot center of the arm.

Yet another object is to provide a post mounted to the saddle for movement therewith relative to the arm, and a second carriage in the form of a collar assembly, vertically and rotationally mounted to the post, the collar assembly carrying the pipe fitting support.

Another object is to provide means for clamping the radial arm to the base at a selected angle relative to the longituinal axis of the main pipe.

An object of this invention is to provide adjustment means between the saddle and the radial arm providing coarse and fine adjustment of the radial distance of said saddle from the pivot axis of the arm, and to provide a clamping means for clamping said saddle to said arm.

A further object is to provide a radial arm which includes a pair of spaced members, and to provide a T-shaped saddle, the saddle including a bearing plate, slidably mounted to said spaced members, and a guide plate dependingly disposed between said spaced members.

Another object is to provide a plurality of lengthwise spaced diametrically opposed pairs of apertures on one of said spaced members, and a pin element insertable within a selected pair of apertures and operatively engageable with the saddle to provide a coarse adjustment therefor; and further to provide a threadedly extensible element connected to said pin and engageable with said saddle to provide a fine adjustment for said saddle.

Yet another object is to provide adjustment means between the collar assembly and the post to locate the collar assembly vertically on the post, and to provide clamping means for clamping the collar assembly to the post at selected elevational and rotational positions relative to said post.

Still another object is to provide a collar assembly which includes a cap receiving said post and having a threadedly extensible element between the post and the cap for elevating said collar assembly relative to said post.

Still another object is to provide both the radial arm and the post with linear scales to facilitate the locating of the pipe fitting support, and to provide the base and collar assembly with protractor scales to facilitate the angular locating of the pipe fitting support.

An object of this invention is to provide a track-mounted locator apparatus which is relatively simple and inexpensive to manufacture, and can be used by an operator without extensive specialized training.

BRIEF DESCRIPTION OF THE DRAWING

FIG. 1 is an elevational view illustrating the apparatus as used to locate a perpendicular branch pipe fitting on a longitudinally extending main pipe;

FIG. 2 is an end view of the apparatus used for the same purpose;

FIG. 6 is an enlarged sectional view taken on line 6—6 of FIG. 1; and

FIG. 7 is an enlarged sectional view taken on line 7—7 of FIG. 1.

DESCRIPTION OF THE PREFERRED EMBODIMENT

Figure 3:
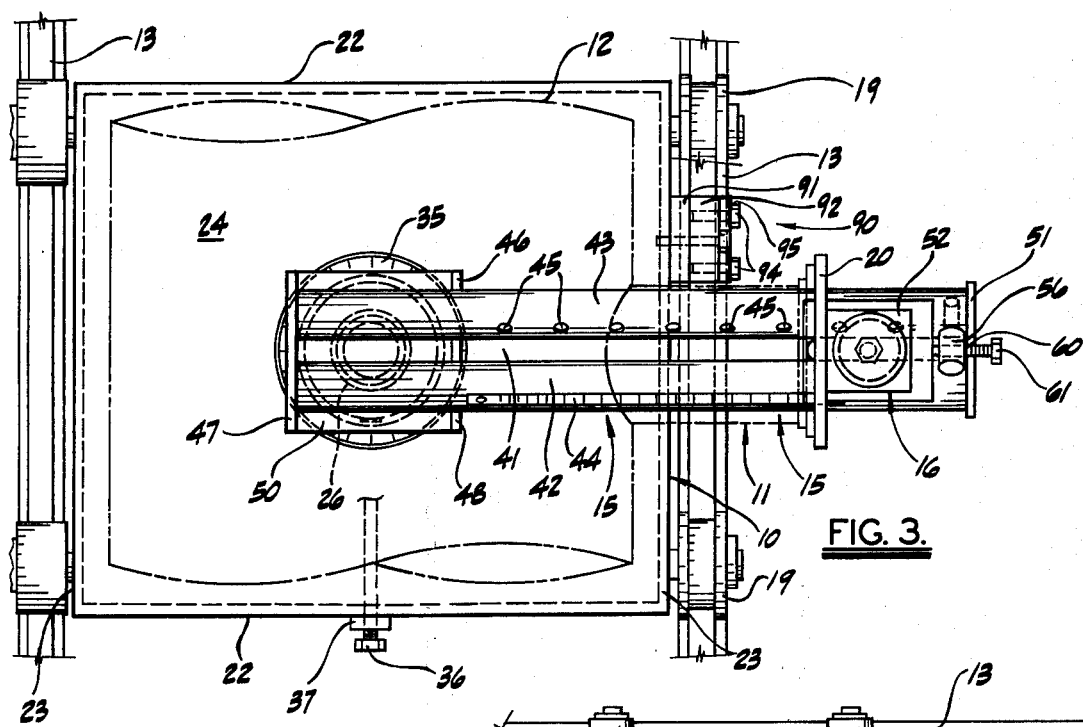
FIG. 3 is a fragmentary plan view of the apparatus used for the same purpose.

Referring now by characters of reference to the drawings, and first to FIGS. 1 and 2, it will be understood that the pipe fitting locator is generally indicated by numeral 10 and finds particular use in supporting a perpendicular branch pipe fitting 11 so that the fitting can be accurately positioned for welding to the side of a longitudinally extending main pipe 12. The pipe 12 is supported in such a manner, for example by end supports of equal height (not shown), that the longitudinal center line is at a constant elevation above the track rails 13 on which the pipe locator 10 rides.

Figure 4:
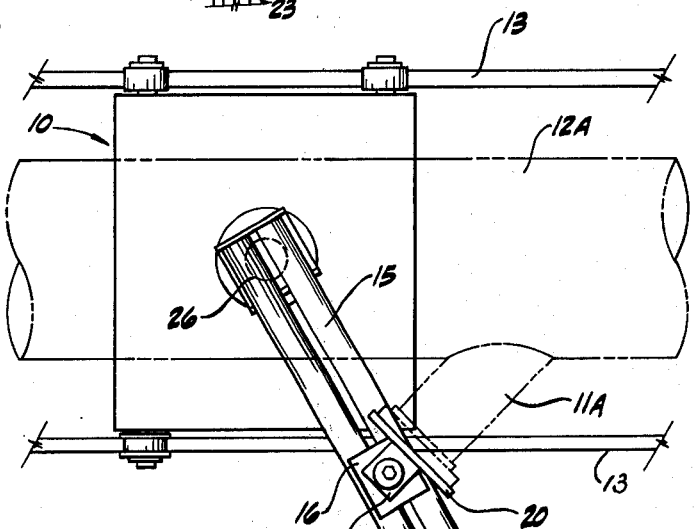
FIG. 4 is a reduced, and somewhat simplified fragmentary plan view of the apparatus as used to locate an inclined branch pipe fitting on a longitudinally extending main pipe.
Figure 5:
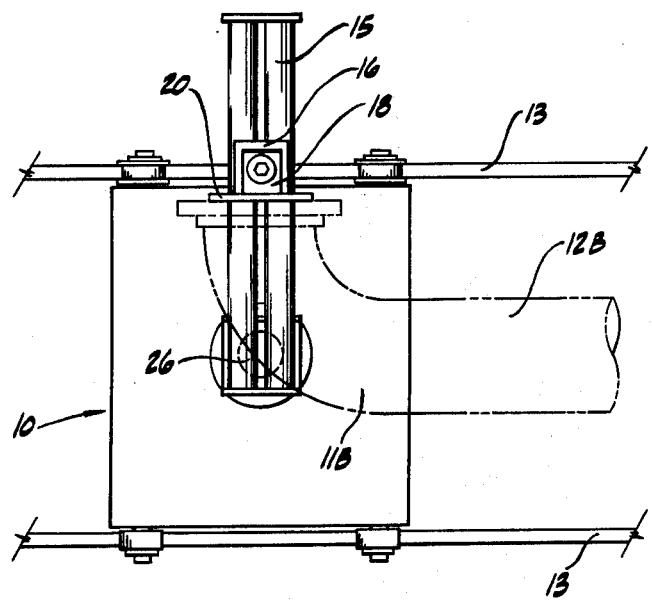
FIG. 5 is a reduced, and somewhat simplified fragmentary plan view of the apparatus used to locate an end elbow on a longitudinally extending main pipe.

The locator 10 comprises essentially a rail-mounted truck 14, which provides a base means for a pivotally mounted radial arm 15. A saddle assembly 16, which constitutes a first carriage means, is mounted for horizontal movement along the radial arm 15. A vertical post assembly 17 is welded or otherwise attached to said saddle assembly, and a collar assembly 18, which constitutes a second carriage means, is mounted for vertical and rotational movement on the post assembly 17. A mounting plate 20, which in the preferred embodiment is part of the collar assembly 18, provides support means for the pipe fitting 11 that is bolted, or otherwise temporarily attached, to said mounting plate 20. Thus supported, a fitting 11 of a selected length within a given range, can be accurately positioned by the locator 10 at a specified location lengthwise of the main pipe 12 and at a desired elevation relative to said pipe. In addition, as shown in FIG. 4, a fitting such as that indicated by 11A can be held at a desired angle relative to the longitudinal axis of a pipe 12A or, as shown in FIG. 5, an elbow fitting such as that indicated by 11B can be positioned for welding to the end of a pipe 12B.

Turning now more specifically to the details of the locator 10 and referring again to FIGS. 1 and 2, it can be seen that the truck 14 is provided with fore and aft wheel assemblies 19 mounted to a box-like body 21 having opposed end plates 22, opposed side plates 23 and spaced upper and lower plates 24 and 25 respectively. A shaft assembly generally indicated by numeral 26 is mounted within the body 21 and provides a vertical pivot axis on the truck 14. The shaft assembly 26 includes an inner shaft 27 welded to a base plate 30 which is attached as by fasteners 31 to a reinforcing plate 32 provided on the body lower plate 25. The shaft assembly 26 also includes an outer sleeve 33 which is provided with a fixed cap plate 34 and is mounted in rotative relation to the inner shaft 27. The body upper plate 24 and a reinforcing plate 35 welded thereto are apertured to receive the outer sleeve 33 which projects upwardly of the body 21. This structural arrangement of parts provides that the outer sleeve 33 can be rotated relative to the truck body 14, and a clamping means is provided by which said rotation can be arrested. The clamping means consists of a clamping screw 36, which is threadedly adjustable relative to a mounting plate 37 provided on one of the body side plates 23, and is provided with a bearing plate 38 by which it can clampingly engage the sleeve 33 to fix the angular location of said sleeve relative to the inner shaft 27. The cap plate 34 is provided with a pointer 39 which indicates the relative angular position of said sleeves on an azimuth protractor, indicated by numeral 40, which is fixedly attached to the upper reinforcing plate 35.

The radial arm 15 is formed from a pair of elongate, spaced tubes 42 and 43 one of which (42) is provided with a radial scale 44 and the other of which (43) is provided with a plurality of diametrically opposed apertures 45 which are spaced at equal intervals for a purpose to be described later. The tubes 42 and 43 are connected in spaced relation at their opposite ends to provide a longitudinal gap 41 therebetween of substantially constant width. At the pivot end, the tubes 42 and 43 are connected by means of a generally U-shaped plate 46 having one arm 47 welded to the tube ends and another arm 48 provided with cut-outs, which receive the tubes 42 and 43 and provide a means by which said tubes are welded to said arm 48. The bight portion 50 of the U-shaped plate is secured to the cap plate 34 of the vertical shaft assembly 26 by fasteners 49, and it will be understood that this structural arrangement of parts provides that the radial arm 15 pivots about the longitudinal axis of said shaft assembly 26. At the remote end of the radial arm 15, the tubes 42 and 43 are connected by means of a plate 51 welded across the tube ends.

The saddle assembly 16 is slidably mounted to the radial arm 15 for lengthwise movement along said arm, and to this end includes a generally T-shaped element comprising a top, horizontal plate 52, constituting a bearing means, and a depending, vertical plate 53 constituting a guide means as shown in FIG. 6. The vertical plate 53 is slightly shorter than the diameter of the tubes 42 and 43, and a keep plate 54 is attached to the weldment as by clamping bolts 55. The bolts 55 are threadedly connected to the keep plate 54 and provide a means by which the saddle assembly 16 can be clamped at a selected location along the length of the radial arm 15. An indicator plate 58 is provided on the saddle top plate 52, and provides a means of gauging the radial distance of the saddle from the pivot center of the radial arm 15 by reference to the scale 44.

The saddle assembly 16 is provided with a coarse and fine movement adjustment. The coarse adjustment is provided by vitrue of a pin 56 having a reduced portion which is received within selected pairs of diametrically opposed apertures 45 disposed along the length of the elongate tube 43. The pin 56 includes a threaded, transverse aperture which receives a threadedly movable fine adjustment screw 61. This adjustment screw 61 engages the saddle top plate 52 and provides for fine adjustment movement of the saddle assembly 16 over a length somewhat greater than the longitudinal spacing of the apertures 45.

The post assembly 17 includes a lower portion 62, which is welded to the saddle top plate 52 and provided with a vertical scale 63, and a reduced upper portion 64. As best shown in FIG. 7, the reduced portion 64 is provided with a plug 65 at its upper end having an opening 66 therein which accommodates a ball 67. The collar assembly 18 which is received by the post assembly 17 includes a cylindrical cap 70. The cylindrical cap 70 is provided with an apertured upper end plate 71 having a nut 72 welded thereto and receiving a height adjustment screw 73 in threaded relation, it being understood that said screw 73 is received within the opening 66 of the post plug 65 and engages the ball 67 in bearing relation. The cap 70 also includes a lower end plate 74, which is apertured at 75 to receive the reduced upper portion 64 of the post assembly 17. The collar assembly 18 also includes a similar plate 76, apertured at 77 to receceive the post upper portion 64. A collar 80 is loosely fitted about the post upper portion 64 and is slidably seated on the plate 76. The plates 74 and 76 are connected at the front end by means of the mounting plate 20 and at the rear end by means of a plate 81. A plurality of rods 82, four in number in the preferred embodiment, depend from and are attached in threaded relation to the plates 200 and 81. The rods 82 support a relatively thin annular element 83 which provides both elevation and angle indication when used in conjunction with the vertical scale 63 of the post assembly 17, such scale being provided with a vertical indicator mark such as that indicated by numeral 87, said annular element 83 being provided with azimuth protractor markings on its upper face. The collar assembly 18 can be clamped in place at a specific angular disposition, by means of a clamping screw 84. The screw 84 is lengthwise adjustable by virtue of a threaded aperture 85 provided in the rear plate 81 and is pressure engageable against the collar 80 to cause said collar 80 to slidably shift and bear against the post upper portion 64 in clamping relation.

In order to ensure that truck 14 will remain in place, said truck is provided at one side with a rail locking assembly 90. This assembly consists of an outwardly projecting element 91 welded, or otherwise attached, to the associated side plate 23, and a depending bracket 92 attached to said element 91 by fasteners 93 and having spaced side elements 94 connected thereto by fasteners 95. The flanking elements 94 overlap the rail 13 and are provided with a transverse clamping bolt 96 so that they can be clamped against said rail 13 and thereby effectively lock the truck 14 in place at a desired longitudinal location. Each of the wheel assemblies 19 includes a pair of wheels 28 and 29 one of which (29) is flanged to ensure accurate alignment of the truck 14 relative to the rails 13.

It is thought that the structural features and functional advantages of this pipe fitting locator having become fully apparent from the foregoing description of parts but for completeness of disclosure the operation of the apparatus will be briefly described.

It will be readily understood that when the rails 13 are accurately aligned at an exact elevation they provide a suitable reference relative to the longitudinal horizontal axis of the pipe 12. The symmetry of the locator ensures that the vertical axis of the shaft assembly 26 about which the radial arm is pivoted can likewise be disposed in direct vertical alignment with the longitudinal axis of said pipe 12. When the upper face of the rail 13, and therefore of the wheel surface engaging the rail, is used as a horizontal datum, the scale 63 can be calibrated in such a way as to provide a direct indication of the elevation of the center of the mounting plate 20, and therefore the horizontal elevation of the branch pipe 11 attached thereto. The truck 14 can be clamped against longitudinal movement by virtue of the rail locking assembly 90.

Referring to FIGS. 1, 2 and 3 it will be understood that the branch pipe 11 is mounted to the mounting plate 20 as by temporary fasteners 86. Once the fitting 11 is mounted to the mounting plate 20, the correct elevation is attained by raising or lowering the collar assembly 18, by means of the adjustment screw 73, with reference to the scale 63. Then, with the pin 56 inserted in an appropriate pair of apertures 45 provided in the elongate tube 43, and with the fine adjustment screw 61 substantially fully retracted, the fine adjustment screw 61 can be turned to engage the saddle top plate 52. The post assembly 17 is fixedly mounted to the saddle assembly 16, and therefore radial movement of the top plate 52 along the tubes 42 and 43 causes equivalent movement of the mounting plate 20 until the fitting 11 is suitably located relative to the pipe 12 for welding to said pipe.

In the event that a branch pipe fitting such as 11R (FIG. 4) is to be welded to a prefabricated main pipe 12A at an angle to the longitudinal axis of said pipe, the exact angle can readily be achieved by virtue of the dual rotative adjustment feature provided by the radial arm assembly 15 and the collar assembly 18. In effect, the swinging radial arm 15, which is pivoted to the truck body 21, can be used to provide a coarse angular adjustment and the collar assembly 18 which is, in effect, rotatable relative to the radial arm 15, can be used to provide a fine adjustment. In addition, the dual rotational movement feature provides an angular range capability which would otherwise require a much longer, and structurally impractical radial arm.

As clearly shown in FIG. 5, the locator 10 can readily be used to attach an elbow fitting, such as that indicated by numeral 11B, to a prefabricated main pipe 12B. In the example illustrated in FIG. 5, the fitting shown is a 90° elbow. However, because of the double rotative feature and because the mounting plate 20 is capable of transverse as well as longitudinal movement relative to the track, the locator is not limited to the positioning standard elbows of this kind, but can be used for a variety of fittings.

I claim as my invention:

1. In a track-mounted, pipe fitting locator apparatus:
   a. base means including a plurality of track-engaging wheels and a vertical pivot axis,
   b. radially extending arm means mounted to the base means for swinging movement about the pivot axis of the base means,
   c. first carriage means mounted to the arm means for adjustable longitudinal movement toward and away from the vertical pivot axis of the base means,
   d. post carried by the first carriage means and having a longitudinal axis substantially parallel to the pivot axis of the base means,
   e. second carriage means mounted to the post means for adjustable longitudinal and rotational movement relative toe the post means said second carriage means including support means for the pipe fitting,
   f. horizontal adjustment means between the first carriage means and the arm means providing both coarse and fine adjustment of the radial distance of the carriage means from the pivot axis of the base means,
   g. clamping means clamping said first carriage means to said arm means at a selected radial distance from said pivot axis of said base means, and
   h. another clamping means clamping said arm means to said base means.

2. In a track-mounted, pipe fitting locator apparatus:
   a. base means including a plurality of track-engaging wheels and a vertical pivot axis,
   b. radially extending arm means mounted to the base means for swinging movement about the pivot axis of the base means,
   c. first carriage means mounted to the arm means for adjustable longitudinal movement toward and away from the vertical pivot axis of the base means,
   d. post means carried by the first carriage means and having a longitudinal axis substantially parallel to the pivot axis of the base means,
   e. second carriage means mounted to the post means for adjustable longitudinal and rotational movement relative to the post means said second carriage means including support means for the pipe fitting,
   f. horizontal adjustment means between the first carriage means and the arm means providing both coarse and fine adjustment of the radial distance of the carriage means from the pivot axis of the base means,
   g. clamping means clamping said first carriage means to said arm means at a selected radial distance from said pivot axis of said base means,
   h. another clamping means clamping said arm means to said base means,
   i. the arm means including a plurality of apertures spaced along the length thereof, and
   j. said horizontal adjustment means between said first carriage means and sais arm means including
      1. a transverse pin selectively received within said apertures and
      2. a threaded element extending between said pin and said first carriage means to operatively engage and move said carriage means on said arm means.

3. A locator as defined in claim 2, in which:
k. said arm means includes a pair of transversely spaced members defining a gap,
l. said carriage means includes a bearing means slidingly mounted to said spaced members, and a depending guide means received within said gap said first carriage clamping means includes a keep plate threadedly attached to but spaced from said guide means and operatively engageable with said spaced arm members in clamping relation.

4. In a track-mounted, pipe fitting locator apparatus:
a. base means including a plurality of track-engaging wheels and a vertical pivot axis,
b. radially extending arm means mounted to the base means for swinging movement about the pivot axis of the base means,
c. first carriage means mounted to the arm means for adjustable longitudinal movement toward and away from the vertical pivot axis of the base means,
d. post means carried by the first carriage means and having a longitudinal axis substantially parallel to the pivot axis of the base means,
e. second carriage means mounted to the post means for adjustable longitudinal and rotational movement relative to the post means said second carriage means including support means for the pipe fitting,
f. vertical adjustment means between the second carriage means and the post means providing vertical adjustment of the second carriage means relative to the first carriage means, and
g. clamping means clamping said second carriage means to said post means at a selected angular location of said second carriage means.

5. A locator as defined in claim 4, in which:
h. the post means includes a first engagement means,
i. the second carriage means includes a second engagement means spaced from the first adjustment means,
j. said vertical adjustment means between said second carriage means and said post means includes extensible means disposed between said first and second engagement means for selectively adjusting the spacing between said engagement means,
k. said post includes an end opening providing said first engagement means,
l. said second carriage means includes a cap receiving said post means and having an end opening providing said second engagement means and a collar loosely disposed about said post means,
m. said extensible means includes an adjustment screw received in threaded relation within one of said openings and in bearing relation within the other of said openings, and
n. said clamping means includes a clamping screw engaging said collar to move the collar into bearing engagement with the post means to clamp said second carriage means to said post means.

* * * * *